Feb. 26, 1924. 1,485,069
G. W. BURT
PROCESS OF MANUFACTURING ICE CREAM MIXES, MILK CHOCOLATE MIXES,
CONFECTION MIXES, AND THE LIKE
Filed May 12, 1919
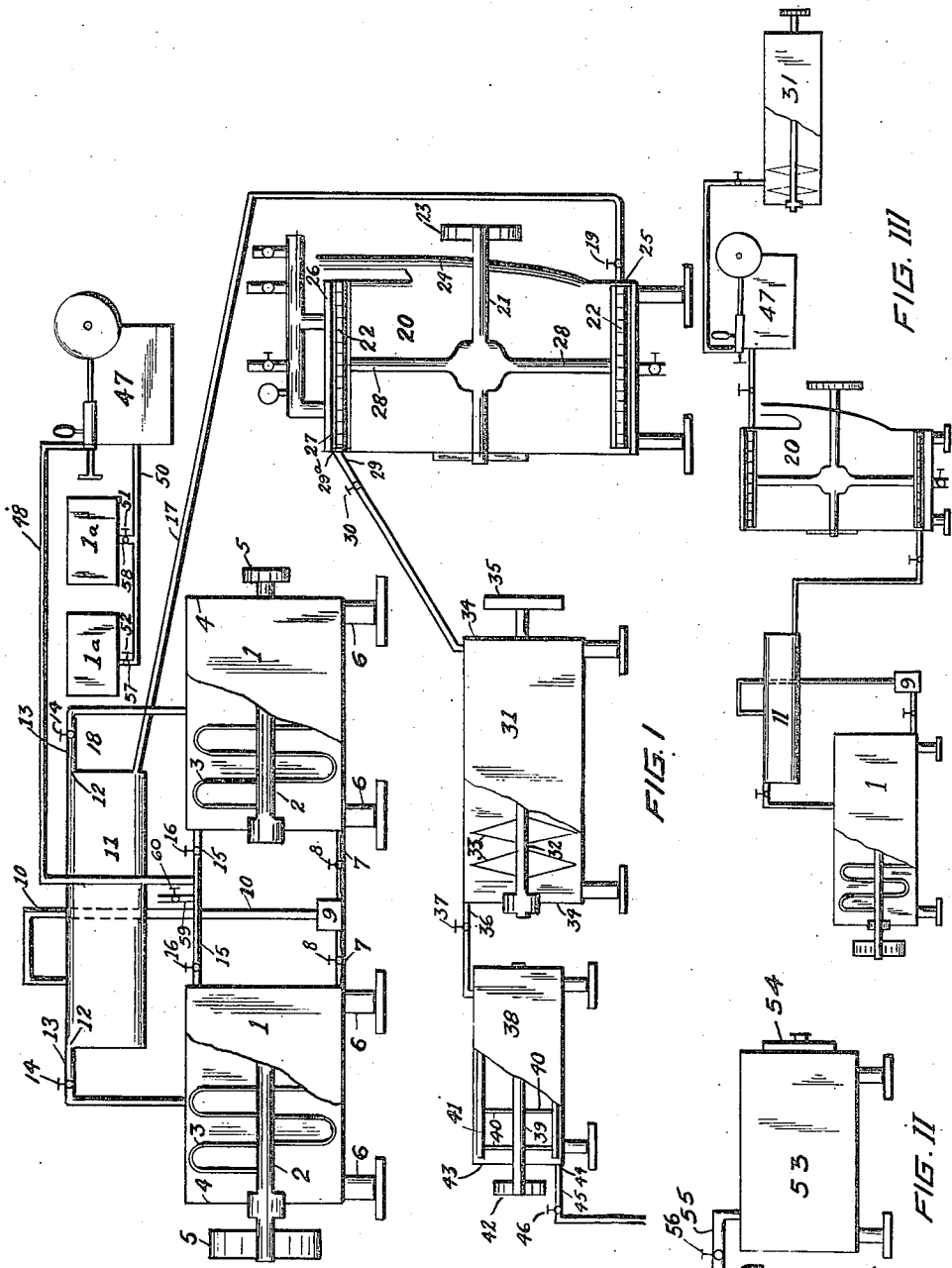

Patented Feb. 26, 1924.

1,485,069

UNITED STATES PATENT OFFICE.

GEORGE WILSON BURT, OF PORTLAND, OREGON, ASSIGNOR, BY MESNE ASSIGNMENTS, TO THE CROUSE-TREMAINE COMPANY, OF CLEVELAND, OHIO, A CORPORATION OF OHIO.

PROCESS OF MANUFACTURING ICE-CREAM MIXES, MILK-CHOCOLATE MIXES, CONFECTION MIXES, AND THE LIKE.

Application filed May 12, 1919. Serial No. 296,406.

*To all whom it may concern:*

Be it known that I, GEORGE W. BURT, a citizen of the United States, residing at the city of Portland, in the county of Multnomah and State of Oregon, have invented certain new and useful Improvements in Processes of Manufacturing Ice-Cream Mixes, Milk-Chocolate Mixes, Confection Mixes, and the like, of which the following is a specification.

As my improved process has been developed in connection with the production of ice cream mixes, I will describe and explain it in that connection.

An ice cream mix consists principally of milk and sugar products, but, as so many combinations of these products, and other products added to them in the manufacture of ice cream, are possible, by the term ice cream mixes may be included a multiplicity of different products. For instance, the laws of States vary as to the percentage of butter fat to be incorporated in ice cream, and it is possible to utilize various sugar and sweetening products in the mixes. Likewise, various gums and forms of gelatine, and pectous products, may be employed to give body and a suitable texture to the products. Thus while the specific composition of ice cream mixes varies considerably, an ice cream mix can generally be defined as a confection consisting of cream, the solids from skimmed milk, sugar products, body-giving products and flavoring materials, combined and ready for introduction into the ice cream freezer. Most ice cream mixes contain from 60% to 70% of moisture.

While the laws of the different States differ as to minimum butter fat content of ice cream and individual tastes vary as to the most suitable ratio of butter fat to other milk solids, it is a fact well known to those skilled in the art that in cow's milk the casein and butter fat are combined with more moisture than is permissible in the ice cream mix. This excess moisture, at some stage in the treatment of the milk, must be removed to give the mix a consistency meeting legal and trade requirements. As is also well known, the commercial practice has been to remove this excess moisture by evaporative condensation of the skimmed or whole milk before the mix is made up.

One of the objects of my invention is the provision of a process of making ice cream mixes which is more economical than prior processes in that it reduces the cost of labor, power, fuel and equipment necessary to produce the mix and, under some conditions, reduces the cost of transportation of the finished ice cream, and further reduces the cost of producing the mix by taking advantage of low milk prices when milk is most plentiful.

A further object of the invention is the provision of a process of producing ice cream mixes by means of which a product of superior quality is more readily secured and a uniform standard as to the quality and formula of the mix can be more readily maintained, this being of especial importance to a manufacturer having several ice cream plants.

Another object of the invention is the provision of a process of making and distributing ice cream mixes which will render the production of ice cream, especially by the small scale producer, more convenient.

Another object of the invention is to facilitate the production of ice cream at points remote from sources of dairy products.

These ends I have attained by producing a complete ice cream mix ready for the freezer, starting with the constituent milk product or products, sugar and body-giving products, and also the flavoring if desired, thoroughly mixing the same in the desired proportions (as to solid constituents), heating this mixture and reducing the moisture contained by evaporation to give the density desired for the mix, finally sterilizing the resultant mix in hermetically sealed containers. Preferably, the mixture is homogenized before or after the condensation. When the mix is soon to be frozen the sterilization may be omitted. In either case, in the heat treatment, during evaporation or prior thereto, the mixture is preferably subjected to a temperature adapted to effect pasteurization, and this is especially true when the mix is not to be sterilized.

In referring herein to "milk products," I mean products containing one or more of the essential and characteristic milk solids and especially the casein and butter fat.

In order that the preferred way of carrying out the process may be thoroughly understood, I will now describe the same in detail, referring to the accompanying drawing which shows forms of apparatus suitable for the purpose.

In the drawing, Figure 1 is a diagrammatic view partly in elevation and partly in section of apparatus adapted to carry out the process.

Fig. 2 is a conventional showing in side elevation of a sterilizer.

Fig. 3 is a diagrammatic view partly in elevation and partly in section of another form of apparatus adapted to carry out the process.

Referring to the accompanying drawings 1ª and 1ª are two conventional mixing, heating, agitating and holding vats, such as are used to heat milk to a pasteurizing temperature and to hold milk at a pasteurizing temperature during the pasteurizing period. Such vats are usually provided with coils for simultaneously heating, mixing, and agitating milk products, and maintaining them during a brief period from 140 degrees Fahrenheit to 180 degrees Fahrenheit, which involves the pasteurizing temperatures for milk. The movement in such vats is applied by mechanical means.

The outflow pipe connections for the vats 1ª and 1ª are shown at 57 and 58, provided with the regulating valves shown at 51 and 52. The pipe connections 57 and 58 are connected with the pipe shown at 50 which is the feed pipe for the homogenizer shown at 47.

The homogenizer 47 is connected with an outlet pipe shown at 48 and which is connected with the intercommunicating pipe shown at 15 and which is provided with regulating valves shown at 16 and 16. The intercommunicating pipe 15 is connected with the vats 1 and 1, and by the alternate opening and closing of the valves shown at 16 and 16 the flow of materials through the pipe 48 may be directed into either of the vats shown at 1 and 1.

Each of the vats 1 and 1 is provided with a central shaft 2 on which is mounted the coil shown at 3. The shaft 2 passes through the end plate 4 and at its outer extremity is provided with a pulley shown at 5.

The vats 1 and 1 are of the usual type of mixing, heating, agitating, and pasteurizing vats such as shown at end elevation at 1ª and 1ª, and are supported by the legs shown at 6 and 6.

The pipe shown at 7, provided with a regulating valve 8 connects the vat 1 with the positive drive plunger pump 9, the pump 9 being connected with the outflow pipe 10 which is adapted to convey materials into the standard outflow vat shown at 11.

The standard outflow vat 11 is provided with overflow pipe connections shown at 13 and 13 provided with regulating valves shown at 14 and 14, and with an outflow pipe connection shown at 17 and which is provided with a regulating valve shown at 19. When it is desirable to introduce materials directly into vats 1 and 1, the materials may be introduced into the pipe 59 provided with a regulating valve shown at 60 and connected with the pipe 15 which is connected with the vats 1 and 1.

The pipe 17 is connected with the orifice 25 in the evaporator shown at 20. The evaporator 20 is of the continuously operating centrifugal type, provided with a central shaft shown at 21, which passes through the wall 24 and at the outer extremity of which is attached the pulley 23 for the application of mechanical power.

Upon the shaft 21 is mounted supporting arms shown at 28, which at their outer extremity are firmly connected with the conveyor blades shown at 22, the outer extremity of which pass in close proximity to the cylinder shown at 27, when power is applied to the shaft 21 through the pulley 23.

The cylinder 27 is surrounded with a steam jacket shown at 26, which is supplied with a heating medium through suitable connections of the conventional type. The evaporator 20 is connected by the pipe 29 provided with the regulating valve 30, with the cooler 31, which is of the rotating disc type provided with a central shaft shown at 32 upon which are mounted the discs shown at 33, and which are adapted for the introduction therein of a cooling medium. The central shaft 32 passes through the end walls shown at 34, and at the outer extremity at one end is firmly attached the pulley 35 for the application of mechanical power.

The cooler 31 is connected by pipe 36 provided with the regulating valve 37 with the standardizing vat shown at 38, and which is provided with a central shaft shown at 39 which passes through the end wall 43, and at its outer extremity is attached the pulley 42 for the application of mechanical power.

Firmly attached to the shaft 39 are supporting arms shown at 40 to the outer extremity of which are attached conveyor blades shown at 41. The standardizing vat 38 is provided at the orifice 44 with the pipe 45 which is provided with the regulating valve 46.

In Fig. 2 is shown at 53 a conventional sterilizer such as is employed in sterilizing evaporated milk. The sterilizer 53 is provided with a steam inlet pipe shown at 55 provided with the valve 56, and at 54 is shown a removable end plate for the introduction of products to be sterilized.

In Fig 3 is shown an alternative arrangement of the apparatus providing for the positioning of the homogenizer 47 adjacent to the evaporator shown at 20, and which permits of the homogenization of materials after the evaporating treatment has been completed in contradistinction to the arrangement shown in Fig. 1 which involves the homogenization of materials prior to their introduction into the evaporator shown at 20.

In the alternative arrangement of apparatus for carrying out my process, a heating, mixing, and holding vat is shown at 1, connected with the standard outflow vat shown at 11, and which is connected with the evaporator 20. The homogenizer 47 is suitably connected with the disc cooler shown at 31.

In practicing my invention for the production of ice cream mixes and the like, by my continuous process, the milk and sugar products in the desired relative proportions as to solids but with excess of moisture, may be introduced into the vats shown at 1ª and 1ª, or they may be introduced into the vats shown at 1 and 1.

When introduced into the vats 1ª and 1ª the materials are mixed, agitated, heated and pasteurized, or, in some cases, the heating and pasteurizing treatment may be dispensed with. By the pipe and valve arrangements connected with the vats 1ª and 1ª, a continuous flow of materials may be maintained through the pipes 57 and 58, provided with the valves 51 and 52 into the pipe 50 which is connected with the homogenizer 47.

The milk and sugar products or materials, after being subjected to homogenization in the homogenizer 47, pass through the pipe 48 into the pipe 15 which is provided with two valves shown at 16 and 16, in such a manner that when the valves are alternately opened and closed, the products may pass into either of the vats 1 and 1, and which are adapted for mixing, heating an agitating the materials of which the ice cream and other mixes and materials are composed.

It is obvious that the body forming products, such as gums and the like, and also flavoring and other materials may be introduced in the desired proportions into the vats shown at 1 and 1, or they may be introduced with the milk and sugar products into the vats 1ª and 1ª and thence through the outflow connections therewith into the homogenizer 47. It is also obvious that any series of steps may be practiced for the introduction of materials of which the mixes are composed into either of the series of vats shown at 1ª and 1ª and at 1 and 1.

The vats 1 and 1 are so connected with the positive drive plunger pump 9 to permit the mixes to pass out of the vats 1 and 1, through the pipes shown at 7 and 7, into the pump 9 and there out through the pipe 10 and into the standard outflow vat 11.

A standard outflow vat is one which maintains an equal level of liquid materials, and is essential to any combination of apparatus for the continuous and uniform treatment of liquid materials by a continuously operated evaporator of the centrifugal type. Likewise, a positive drive plunger pump is necessary to successfully and efficiently pump materials containing sugar products and a percentage of solids approximating 25% of the total weight of the materials passing therethrough.

The products treated pass out of the equal pressure vat through the pipe 17, and their flow into the centrifugal evaporator 20 is regulated by the valve 19.

The valve 19 is essential to the proper regulation and operation of the evaporator 20, as the density of the condensed product, all other things being equal, depends upon the rate at which the materials flow into and through the evaporator.

This type of evaporator, when power is applied to the shaft 21, through the pulley 23, provides means for the application of centrifugal force and circumferential motion to the materials to be treated. The conveyer blades 22 which are connected with the shaft 21, by the supporting arms 28, moving in close proximity to the concave surface of the cylinder, 27, spread the materials over the concave surface, which is heated by the introduction of steam or hot water into the jacket shown at 26.

In practice I usually maintain from 50 to 75 pounds steam pressure in the jacket 26, in order to provide means for rapid concentration of the ice cream and other mixes and materials. This high temperature applied to the heat transmitting medium (cylinder wall) shown at 27, enables the production of high concentrates within a few seconds, and I have found in practice that the rate of evaporation not only depends upon the use of heat but also upon the density of the materials containing liquid substances which are treated. For instance, when high temperatures are employed in the jacket 26, the rate of evaporation per square foot of heating surface per hour will approximate 100 pounds of water. This water expands to 1700 times its volume when converted into steam, and this steam must pass through the materials being treated in order to escape into the central hollow space in the interior of the evaporator, the liquid materials treated being continuously forced outward against the hot surface of the cylinder 27 by the centrifugal action. The passage through the liquid materials being treated, of this large volume of steam, greatly reduces the density of the materials under treatment, and thereby increases their susceptibility to physical changes, and, also decreases the susceptibility of the materials to chemical changes, each of which effects eminently adapts the process for the concentration of ice cream mixes, confection mixes, and the like.

The condensed or concentrated materials enter the evaporator continuously through the orifice 25 and leave the evaporator continuously through the orifice 29$^a$ and pass through the pipe 29 into the cooler 31.

I have found in practice, that in order to prevent such products as ice cream mixes, and others containing sugar products, from caramelization and crystalization it is necessary to reduce their temperature soon after they pass out of the evaporator, wherein, they are subjected to a temperature exceeding the boiling point of water. As near as I can ascertain the temperature to which the materials are subjected in my process ranges from the boiling point to 220 degrees Fahrenheit, although I do not confine myself to these temperatures as a lower steam pressure and correspondingly lower temperatures may be advantageously employed in my continuous process. It is, however, preferable to employ high temperatures in order to secure a reduction of the density of the materials while being treated.

It will be noted that the style of cooler shown at 31 is of the continuous type, the cooling medium which I have employed being water. The cooled materials pass continuously out of the cooler through the pipe 36 and into the standardizer shown at 38.

It is obvious that accidents may occur at any time to temporarily interrupt the flow of materials through the evaporator, or to vary the flow into the evaporator, and thereby vary the density of the materials passing through the cooler and into the standardizing vat 38. For this reason a standardizing vat should preferably be of considerable capacity and provided with internal moving parts to thoroughly mix the materials treated, and thereby evenly distribute the solid and moisture content.

When the mixing, heating, agitating, evaporating, cooling and standardizing treatment has been completed, the products are placed in the sterilizer shown at 53, in Fig. 2, and heated to a suitable temperature to destroy any bacteria which may be therein contained. This treatment is not necessary where the product is to be frozen within a limited period after its treatment has been completed, but it is necessary where the product is to be placed in hermetically sealed containers and held under atmospheric temperature over a prolonged period. The temperatures employed in the sterilizer are the usual temperatures, above the boiling point, to which evaporated milk is subjected, but depend more or less upon the amount of sugar and the total solids present in the materials treated, ranging between 215 degrees Fahrenheit and 235 degrees Fahrenheit. The finished product in hermetically sealed containers, is introduced into the sterilizer through the door shown at 54, and steam is permitted to enter the sterilizer through the pipe connection 55 provided with the regulating valve 56.

In case of temporary impairment of the vats 1$^a$ and 1$^a$, or the homogenizer 47, or for any other reason, the products entering into the mixes may be introduced into the vats 1 and 1, and mixed, heated, agitated, or pasteurized, and then passed through the apparatus and process described. In such an event, the milk products, or other liquid products, may be introduced into the pipe connection 59, provided with a valve 60, and enter the vats 1 and 1 through the pipe 15, which is an intercommunicating pipe between the vats 1 and 1.

In the alternative arrangement of apparatus shown in Fig. 3, the products to be treated are mixed, agitated, heated and pasteurized in the vat shown at 1, thereafter forced by the pump 9, provided with suitable connections, into the standard outflow vat 11 provided with suitable connections with the evaporator 20, from which they continuously flow through suitable pipe connections into the homogenizer 47, and thereafter through suitable connections into the cooler shown at 31.

It is obvious that in the alternative arrangement of apparatus, any of the apparatus shown in the preferred arrangement as set out in Fig. 1, may be employed, for instance, a series of heating, agitating, mixing, and pasteurizing vats. The alternative form of arrangement of apparatus is shown to set out the use of the homogenizer, and homogenization, after the evaporating treatment has been effected, instead of before as set out in Fig. 1, showing the preferred form of arrangement of apparatus.

By the arrangement of apparatus as shown, and by the process as described, it is possible to provide a continuous flow of materials to be treated through the pipe 50 through all the direct and indirect connections therewith throughout the entire process. It is obvious that the standardizer can be omitted from the apparatus and process without deviating materially from the invention, and also that the homogenizing treatment can also be omitted. It is, however, preferable to use the homogenizer as homogenization effects a smoother ice cream mix and frozen product, as the various ingredients entering into an ice cream mix are of different specific gravities, and the process of homogenization gives a uniform specific gravity to all portions of the mix, thereby preventing separation.

I consider it advantageous and preferable that all of the ingredients entering into mixes be introduced into the vats 1$^a$ and 1$^a$ in order that all portions of the mix will pass through the pipe connections therefrom into the homogenizer shown at 47. In effecting the homogenization of the mix the invention, it will be understood, is not limited to the use of any particular apparatus, as any of the suitable forms of apparatus variously known to the trade as homogenizers, viscolizers, etc., can be used.

It is obvious that when the mixes are released from the vats 1ᵃ and 1ᵃ to the homogenizer, or when they are released from the vats 1 and 1 to the pump 9, that they have been properly mixed, or heated, or agitated, or pasteurized, by the application of mechanical power to the internal moving parts, and that as the products, materials or mixes pass continuously from one device to another, that the internal moving parts are set in motion, with the valves properly adjusted for continuous operation.

A plant adapted to carry out my improved process can advantageously be located in a dairy district and it will readily be seen that an ice cream mix produced as described at such a country condensing plant can be shipped as required to ice cream factories in urban districts and when received at the ice cream factories is ready for freezing.

Therefore, the expensive mixing, pasteurizing and testing equipment required at the ice cream factory under the ordinary practice is made unnecessary by my improved process. Also, the labor required to produce the mix is substantially reduced and a decidedly lower degree of skill is required on the part of the operators in the ice cream plant, all necessary testing and standardizing having been done at the condensing plant. Furthermore, since the pasteurization of the entire mix is effected, in the case of my process, during the condensing operation, it is obvious that power and fuel are saved.

It is clear that by the use of my improved process a desired standard for the finished product can be maintained regardless of the number or location of the ice cream plants since all testing and standardizing is done at the one condensing plant. This, of course, is a result greatly to be desired where ice cream from several factories is being marketed under one name or trade-mark.

Furthermore, a mix of superior quality is more readily and, therefore, more uniformly secured with my improved process by virtue of the fact that all of the ingredients are brought together and commingled in a more fluid state than in the case of the prior practice. Heretofore, in the commercial production of ice cream, condensed milk products have been used in making up the mix so that no excess moisture remained to be removed by evaporation, whereas in my process the constituents of the mix are brought together with an excess of water, (such, or example, as would be incident to the use of milk with its normal amount of water), and the resultant greater fluidity of the mixture makes the solution or intimate intermixture of the solid constituents much more readily and thoroughly accomplished than is possible in the prior practice referred to.

As above remarked, the hermetical sealing and sterilization of the mix is unnecessary where it is to be frozen without great delay; but by the hermetical sealing and sterilization of the mix it becomes possible to hold the mix indefinitely at ordinary temperatures and to ship it where desired and use it when desired. The advantages of this will be obvious especially to those familiar with the conditions in the ice cream trade.

The apparatus and process herein described are adapted for the treatment of any materials containing liquid substances, and either after the treatment is completed or at a later date, other materials may be added thereto. For instance, manufacturers of ice cream frequently specialize on special mixes and flavors, and it is obvious that flavoring materials and other materials may be added to confection mixes without deviating from the inventions described.

It is obvious that the temperatures to which the materials are subjected may be varied during the evaporating treatment in accordance with the properties of the materials, and, if necessary an evaporator may be employed operating under reduced atmospheric pressure by the use of a vacuum created therein, without deviating from the purposes of the invention.

Also, while I have described the commonly used ice-cream mix made up of milk products, sweetening and flavoring materials and body-giving substances, it will be obvious that my process is applicable to any combination of solids suitable for an ice-cream mix where some of said solids are combined with an excess of water which must be removed to bring the mix to the desired standard of concentration.

I have in the foregoing description and the accompanying drawings set forth in detail the preferred manner of practicing my invention and it will be understood that this is done for purposes of illustration and explanation and that the scope of the invention is indicated by the appended claims.

What I claim is—

1. The process of producing ice cream mixes which comprises forming a mixture of the milk products, sweetening materials and body-giving materials in the desired proportions as to solids but with moisture in excess of the amount desired for the final mix, evaporating said mixture until the moisture content is reduced to a value not exceeding the desired amount, and homogenizing the mixture.

2. The process of producing ice cream mixes which comprises forming a mixture of the milk products, sweetening materials and body-giving materials in the desired proportions as to solids but with moisture in excess of the amount desired for the final mix, evaporating said mixture until the moisture content is reduced to a value not exceeding the desired amount, homogenizing the mixture, and sterilizing the resulting ice cream mix in hermetically sealed containers.

3. The process of producing ice cream mixes which comprises forming a mixture of the milk products, sweetening materials and body-giving materials in the desired proportions as to solids but with moisture in excess of the amount desired for the final mix, evaporating said mixture by passing it over the concave surface of a heated drum or cylinder with circumferential motion and under the action of centrifugal force until the moisture content is reduced to a value not exceeding the desired amount, and homogenizing the mixture.

4. The process of producing ice-cream mixes which comprises forming a mixture of the milk products and the other ingredients of the mix in the desired proportions as to solids but with the moisture in excess of the amount desired for the final mix, evaporating said mixture until the moisture content is reduced to a value not exceeding the desired amount, and homogenizing the mixture.

5. The process hereinbefore described of making an ice cream mix which consists in pasteurizing a suitable mixture of a lacteal substance, a fat yielding substance, and a saccharine substance, immediately thereafter condensing without ageing this mixture, and then emulsifying the mixture thus treated, and cooling it.

GEORGE WILSON BURT.